April 28, 1936.  H. K. RADER  2,038,869

JOINT

Filed Oct. 14, 1935  2 Sheets-Sheet 1

Harold K. Rader,
Inventor,
Delos F. Haynes,
Attorney.

April 28, 1936.  H. K. RADER  2,038,869
JOINT
Filed Oct. 14, 1935   2 Sheets-Sheet 2
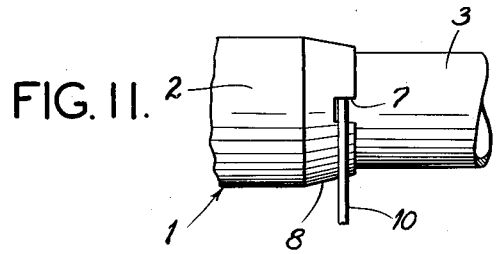
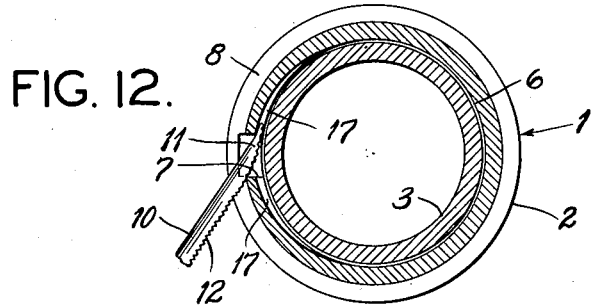
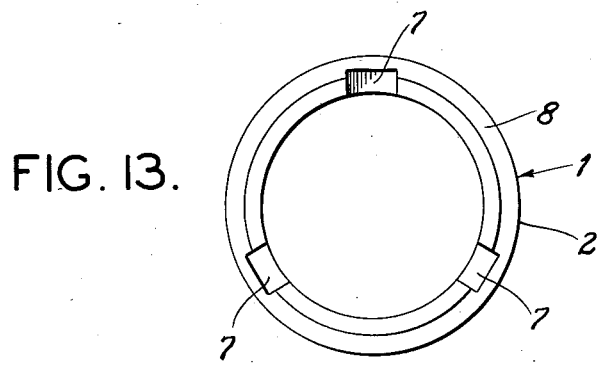
Harold K. Rader,
Inventor,
Attorney Patented Apr. 28, 1936

2,038,869

UNITED STATES PATENT OFFICE 2,038,869

JOINT

Harold K. Rader, Port Huron, Mich., assignor to Mueller Brass Co., Port Huron, Mich., a corporation of Michigan Application October 14, 1935, Serial No. 44,929

4 Claims. (Cl. 285—117)

This invention relates to joints and fittings, and with regard to certain more specific features, to joints and fittings for connecting together lengths of pipe and the like.

Among the several objects of the invention may be noted the provision of a pipe or like fitting which is adapted to produce an improved locked joint between the pipe and fitting; the provision of a fitting of the class described which, in addition to providing a locked joint, is adapted for the effectuation of a securely sealed joint; the provision of a fitting of the class described which may be assembled into a joint with minimum effort and maximum speed and facility; and the provision of a fitting of the class described which is relatively simple and economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a side elevation of a T-fitting embodying the present invention, showing a pipe inserted and a joint made therewith;

Fig. 11 is a view similar to Fig. 5, showing an alternative embodiment of the invention;

Fig. 12 is a view similar to Fig. 6, showing another alternative; and,

Fig. 13 is an end elevation of a fitting, showing still another alternative.

Similar reference characters indicate corresponding parts throughout the several views of the drawings.

Figure 1:
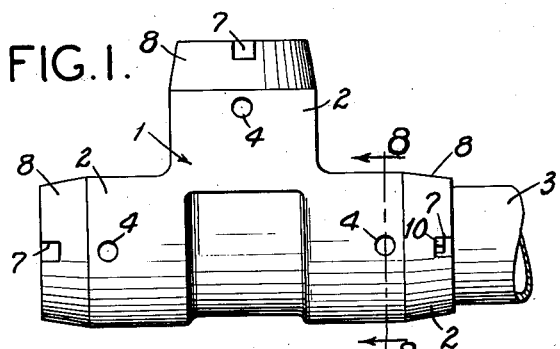

Referring now more particularly to Fig. 1, numeral 1 indicates a relatively heavy-walled, metallic pipe fitting, which, for purpose of illustration, has been shown as a T. The T has been chosen for exemplary purposes only, and it is to be understood that the invention applies with equal facility to all classes of pipe fittings, as L's, couplings, crosses, nipples, adapters, caps, valve ends, and the like, the sole criterion being that the fitting must have a socket portion 2 which is adapted to telescopingly receive the length of pipe or the like which it is desired to connect thereto. The T-fitting illustrated, in accordance with its shape, has three such socket portions 2.

Figure 2:
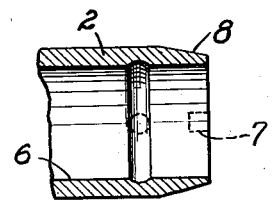
Fig. 2 is a longitudinal section of the fitting of Fig. 1, but omitting the pipe shown in Fig. 1.

Basically, the fitting 1 is of the general type shown in Gresley et al., Patent Number 1,776,502, dated September 23, 1930. That is, it is a fitting designed particularly for use with unthreaded, relatively thin-walled pipe, which is usually made of copper. Such a pipe, for example, is indicated at numeral 3. In accordance with the teaching of the said Gresley patent, the joint effected with this fitting is made by telescoping the pipe 3 into one of the sockets 2, and thereafter introducing liquid solder or like sealing material through a sprue or feed-hole 4 into an internal groove 5 (see Fig. 2), whence it is fed by capillary attraction to the interface region between the pipe and fitting. It will be understood that the receiving portion of the socket 2 and the pipe 3 are so dimensioned that the clearance therebetween is of suitable size to induce such capillary flow of the liquid solder.

The present invention provides new means, in addition to the solder film described, whereby the pipe 3 is securely locked into the fitting 1.

Figure 6:
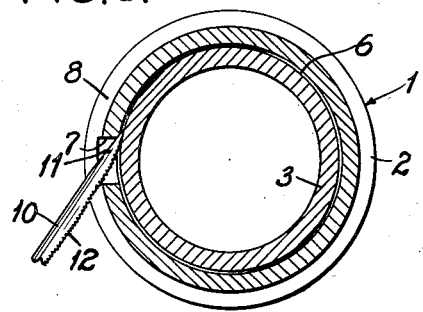
Fig. 6 is a cross section taken substantially along line 6—6 of Fig. 5.

Referring now more particularly to Figs. 1 and 6, numeral 6 indicates the inner, smooth, cylindrical wall of the socket portion 2. Numeral 7 indicates a notch, of rectangular shape, which is cut or milled into the end of the fitting, in the region of the tapered end 8 thereof. The notch 7 should have an appreciable depth lengthwise of the socket portion 2. In the embodiment shown (see Fig. 6) the side walls of the notch 7 are approximately at right angles to the surfaces of the fitting but this arrangement is not necessary and under some circumstances, the side walls of the notch 7 may desirably be tapered or sloped, being wider at the inside of the fitting than at the outside thereof.

Figure 3:
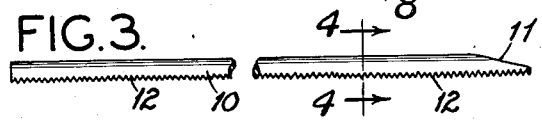
Fig. 3 is an enlarged side elevation of a locking member.
Figure 4:
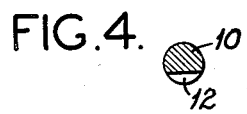
Fig. 4 is an enlarged cross section of the locking member taken substantially along line 4—4 of Fig. 3.

Referring now to Fig. 3, numeral 10 indicates a length of wire which is usually of circular cross section. The circular cross section is not essential to the present invention, but it has been found to operate advantageously. The length of the wire 10 is preferably slightly over the circumferential length of the wall 6, for purposes which will be made apparent hereinafter. At one end of the wire 10 there is provided a tapered portion 11 (see Fig. 3). Along the entire length of the wire 10, on the side thereof opposite the tapered portion 11, there are provided corrugations or serrations 12. The serrations 12 are desirably sufficiently sharp so that they are able to bite into the metal of the pipe 3, as will be pointed out hereinafter. The shape of the serrations 12 is indicated in Fig. 4, which is an enlarged cross-sectional view of the wire 10.

It is preferable, both from the standpoint of ease of manufacture, and from the standpoint of more readily securing a good joint, that the serrations 12 extend the entire length of the wire 10. However, under certain circumstances this is not altogether necessary, and a short region of corrugations or serrations need only be provided near the tapered end 11.

Figure 5:
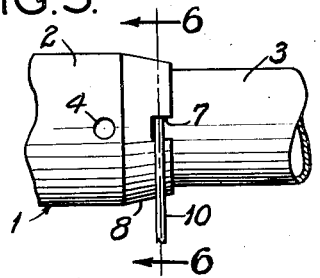
Fig. 5 is a fragmentary elevation, similar to Fig. 1 illustrating the original position of the locking member.
Figure 7:
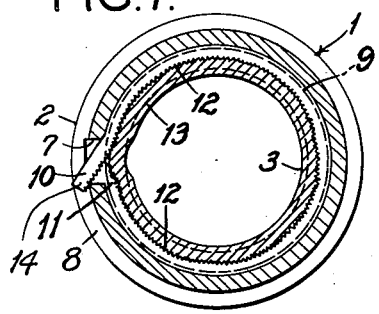
Fig. 7 is a view similar to Fig. 6 illustrating the final positioning of the locking member.

The wire 10 constitutes the locking member of the present invention. Its application is indicated in Fig. 5, 6, and 7, in the order stated. Referring to Fig. 5, it will be seen that the pipe 3 is now shown as inserted into the socket 2 of the fitting 1. The tapered end 11 of the wire 10 is now inserted through the notch 7 adjacent the bottom thereof, in such manner that it is tangential to the pipe 3 and the serrations 12 engage the sides of pipe 3.

If the pipe 3 is now manually grasped, exteriorly of the fitting, and turned with considerable force in a clockwise manner, it will be seen that the serrations 12 bite into the walls of said pipe, thereby dragging or pulling along the wire 10. The wire 10 is desirably made of a material harder than that of the pipe 3. For example, if the pipe 3 is copper, the wire 10 may be of brass, steel, iron, or the like. Because of this relative difference in hardness, a groove 13 (see also Fig. 7) is forced into the pipe 3 as it is turned. Because of the thin walls of the pipe 3, the groove 13 is accompanied by a corresponding bead on the inner surface of the pipe 3. The same relationship of hardness likewise exists between the wire 10 and the fitting 1. While there are no serrations 12 to bite the fitting walls, at the same time the wire 10 forces a shallow groove into the smooth wall 6 of the fitting. This groove is indicated by numeral 9 in Fig. 7.

When the pipe has made one complete revolution, to the position illustrated in Fig. 7, the grooves 9 and 13 will extend substantially completely around both the pipe and the fitting. The wire 10 is now almost entirely within the fitting and lying in oppositely facing grooves, 9 in the fitting and 13 in the pipe. Because of the tight fit afforded, the pipe is thus securely locked into the fitting.

As heretofore intimated, the length of the wire 10 is desirably somewhat greater than the circumference of the pipe 3. This means that when the position of Fig. 7 has been achieved, a short length of wire 10, indicated by numeral 14, is left extending through the notch 7. This end 14, visible from the exterior of the fitting, forms a signal or sign that the completed joint is a locked one. If no such signal is desired, the length of the wire 10 may be made such that it is entirely drawn within the fitting in the course of rotating the pipe, thus leaving no end 14 exposed.

Figure 8:
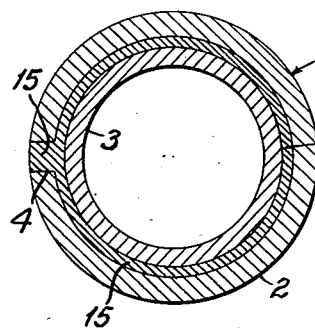
Fig. 8 is a cross section taken substantially along line 8—8 of Fig. 1.

When the wire 10 has thus been entirely drawn into the fitting and the position in Fig. 7 achieved, melted solder or other suitable sealing material may be fed into the sprue or opening 4, to flow around the interior groove 5, and then spread by capillary attraction to the interfacial region between the pipe and the fitting, to seal the joint. Fig. 8 is a cross section on solder-distributing groove 5 and sprue 4, and shows the sealing material in position as indicated by numeral 15. By the addition of said sealing material, the joint is made tight or is sealed, in addition to being locked.

A combination locked and sealed joint, such as that just described is particularly useful, for example, in fire sprinkler installations where it is essential that the installation remain in position even though the temperature becomes sufficiently high to melt out the solder. With a joint as thus described, even if the solder or sealing material melts and runs out of the joint, a locked joint which is relatively tightly sealed is still maintained, and the pipe does not come out of the fitting. In many other circumstances, such a type of joint is desirable.

Figure 9:
Fig. 9 is a fragmentary view, similar to Fig. 3, illustrating an alternative form of locking member.
Figure 10:
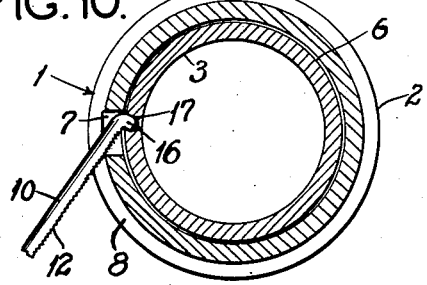
Fig. 10 is a sectional view, similar to Fig. 6, showing the use of the locking member of Fig. 9.

Fig. 9 illustrates a form of locking wire 10 which may be used in alternative manner to that shown in Fig. 3. In the Fig. 9 embodiment the tapered end 11 is dispensed with, while the analogous end of the wire 10 is bent down to form a short hook or ear or projection 16. In using this form of locking wire, a shallow hole 17 is drilled into the side of the pipe 3 (see Fig. 10) after the pipe is in position in the fitting, the drilling being preferably done through the notch 7. The end 16 of the wire 10 is then hooked into the hole 17, and the pipe 3 turned as in the previous embodiment. The engagement of the end 16 in the hole 17 causes the wire 10 to be pulled into the joint and its final position is substantially as illustrated in Fig. 7.

The taper 11 and the hooked end 16 thus both comprise means on the end of the wire 10 whereby it is attached to the pipe 3.

The locking wires shown in Figs. 3 and 9 are described and claimed in the copending application of Francis Jordan Wilson, Serial No. 69,891, filed March 20, 1936.

The hole 17, may if desired, be drilled entirely through the pipe 3, as the sealing material later added to the joint completely seals off this region and no leak is thereby established.

With the Fig. 9 embodiment, the serrations 12 are not as important as they are with the Fig. 3 embodiment, for the engagement between the end 14 and the hole 16 is usually sufficient to draw the entire length of the wire 10 into the fitting in making the joint. However, the serrations 12 when provided in the Fig. 9 embodiment, have an additive holding effect and are advantageously, though not necessarily, provided.

It is important to note, in connection with the embodiment described, that no guiding means is provided for the locking wire 10 as it is fed into the joint. It has been found by experience, that frequently no guiding means is necessary for this purpose, the wire 10 maintaining itself in the proper plane automatically as it is fed into the joint. However, in some instances it is advisable to provide guiding means, and Fig. 12 shows an embodiment of the invention so provided. Leading in each direction from the notch 1, in the plane of the ultimate position of the wire 10, are a pair of short grooves 17. These grooves 17 guide the wire 10 as it commences to travel around the pipe. They lead only a relatively short distance into the fitting. One groove 17 is used if the pipe 3 is being turned clockwise, while the other groove 17 is used when the pipe 3 is being turned counterclockwise.

Under some circumstances, it is not necessary to provide the solder sprue 4 or the interval groove 5, as the solder may be satisfactorily introduced at the notch 1, and spread through the groove created by the embedded locking wire 10. Fig. 11 illustrates such a fitting, which is identical to the embodiments of Figs. 1 through 8, except that no sprue 4 or interior annular groove 5 is provided.

Fig. 13 shows an embodiment in which a plurality (three, for example) of notches 1 are provided in a fitting. Such a plurality makes it easier, in the installation of a piping system, to find at least one notch in available position for inserting the locking wire 10.

It will be understood that the alternatives of Figures 11, 12, and 13 may be utilized separately or in conjunction in the same fitting.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A joint comprising a relatively heavy-walled metallic fitting having a socket, a thin-walled metallic entering member telescopingly received in said socket, said socket having an opening therein, a wire locking member formed of a metal harder than the metal of the fitting or the metal of the entering member, said locking member being introduced through said opening and lying substantially entirely in a plane perpendicular to the axis of said socket and engaging the socket and the entering member in such manner as to form oppositely faced grooves therein, with a bead on the interior of the entering member, and a film of solidified sealing material occupying the interfacial region between said socket and said entering member.

2. A joint comprising a fitting having a socket, a thin-walled metallic entering member telescopingly received in said socket, said socket having a preformed interior groove extending from said opening a distance short of complete encircling of the socket, a locking member in said groove and extending therebeyond substantially completely to encircle said entering member, said locking member engaging the entering member in such manner as to form an oppositely faced groove therein, with a bead on the interior of the entering member, and a film of solidified sealing material occupying the interfacial region between said socket and said entering member.

3. A joint comprising a fitting having a socket, a thin-walled metallic entering member telescopingly received in said socket, said socket having an opening, and a preformed interior groove extending from said opening a distance short of complete encircling of the socket, a wire locking member introduced through said opening and positioned in said groove and extending beyond said groove substantially completely to encircle said entering member, said locking member engaging the entering member in such manner as to form an oppositely faced substantially completely encircling groove therein, with a substantially completely encircling bead on the interior of the entering member, and a film of solidified sealing material occupying the interfacial region between said socket and said entering member.

4. A joint comprising a fitting having a socket, a thin-walled metallic entering member telescopingly received in said socket, said socket having an opening, and a preformed interior groove extending annularly from said opening a distance short of complete encircling of the socket, a wire locking member introduced through said opening and positioned in said groove and extending beyond said groove substantially completely to encircle said entering member, said locking member engaging the entering member in such manner as to form an oppositely faced substantially complete annular groove therein, with a substantially complete annular bead on the interior of the entering member, and a film of solidified sealing material occupying the interfacial region between said socket and said entering member.

HAROLD K. RADER.